(12) United States Patent
Sage et al.

(10) Patent No.: US 11,745,775 B2
(45) Date of Patent: *Sep. 5, 2023

(54) RAILWAY SHUNT ENCLOSURE

(71) Applicant: C.D.L. Electric Company, Inc., Pittsburg, KS (US)

(72) Inventors: Devin Steven Sage, Pittsburg, KS (US); Marco Antonio Ibarra, Pittsburg, KS (US); Angel Gustavo Cereceres Pena, Pittsburg, KS (US)

(73) Assignee: C.D.L. Electric Company, Inc., Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,574

(22) Filed: Feb. 23, 2023

(65) Prior Publication Data

US 2023/0192161 A1 Jun. 22, 2023

Related U.S. Application Data

(63) Continuation of application No. 17/353,899, filed on Jun. 22, 2021.

(51) Int. Cl.
*B61L 1/18* (2006.01)
*H02B 1/01* (2006.01)
*H02B 1/052* (2006.01)
*H02B 1/20* (2006.01)
*H02B 11/02* (2006.01)

(52) U.S. Cl.
CPC .............. *B61L 1/181* (2013.01); *H02B 1/012* (2013.01); *H02B 1/0523* (2013.01); *H02B 1/205* (2013.01); *H02B 11/02* (2013.01)

(58) Field of Classification Search
CPC ........................................................ B61L 1/18
USPC .......................................................... 174/50
See application file for complete search history.

(56) References Cited

U.S. PATENT DOCUMENTS 5,967,836 A * 10/1999 Bailey .................... H01R 24/76
439/534
7,737,360 B2 * 6/2010 Wiemeyer ................ H04Q 1/13
361/679.01

FOREIGN PATENT DOCUMENTS

FR 3641327 * 10/2018

* cited by examiner

*Primary Examiner* — Stanley Tso
(74) *Attorney, Agent, or Firm* — Hovey Williams LLP

(57) ABSTRACT

A railway termination shunt enclosure including one or more receptacles, each of the one or more receptacles being configured to receive a termination shunt. The enclosure also includes at least one mounting surface and a connector assembly rotatably attaching the one or more receptacles to one or more of the at least one mounting surface.

18 Claims, 12 Drawing Sheets

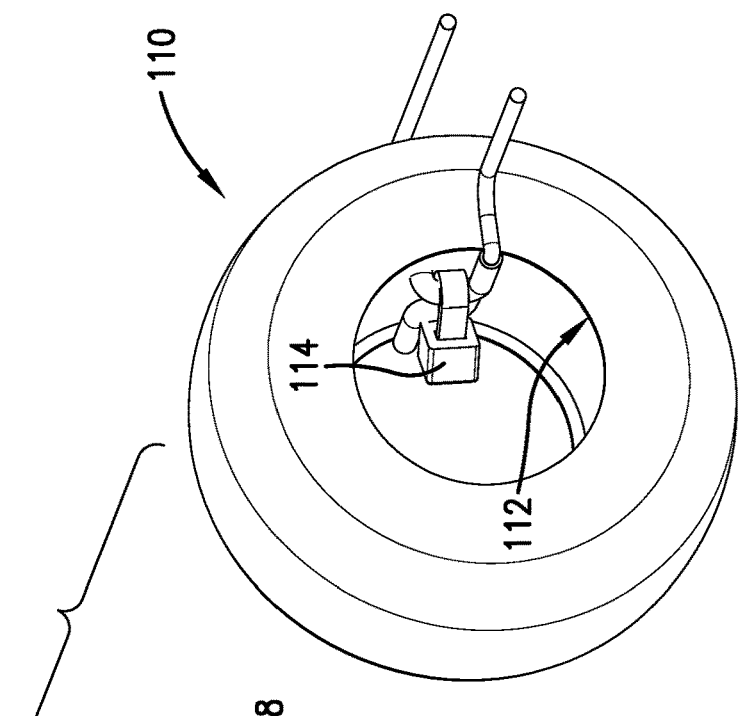
Fig. 11.
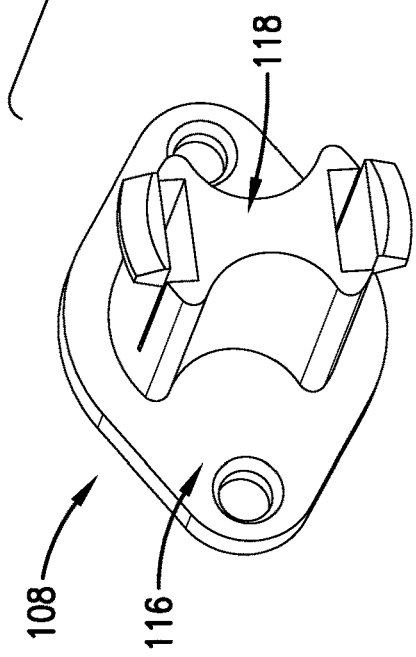
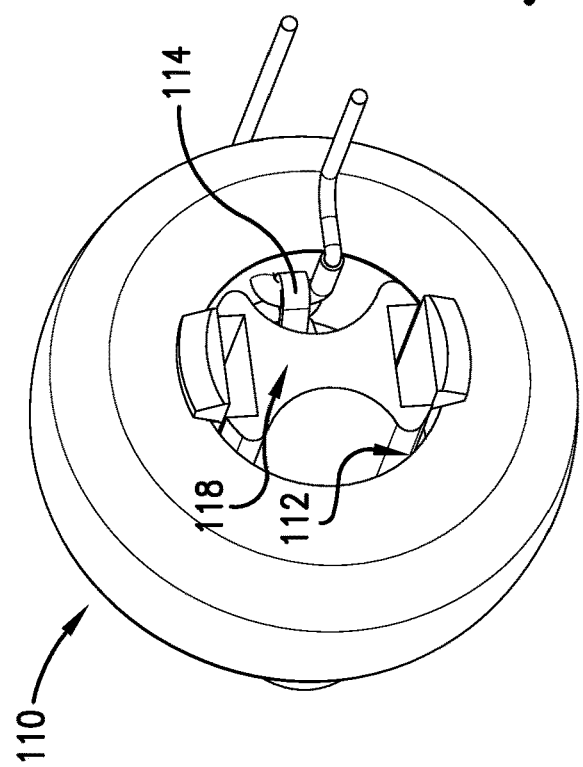
Fig. 12.

RAILWAY SHUNT ENCLOSURE

CROSS REFERENCE TO RELATED APPLICATIONS

This is a continuation of U.S. patent application Ser. No. 17/353,899, filed Jun. 22, 2021, and titled RAILWAY SHUNT ENCLOSURE, the entirety of which is hereby incorporated by reference.

BACKGROUND OF THE INVENTION

Field of the Invention

The present invention relates to a railway shunt enclosure. More particularly, the present invention relates to apparatus for mounting railway termination shunts within enclosures.

Discussion of the Related Art

Railway termination shunts often include electrical components in electrical communication with cables carrying signals from a warning predictor track circuit that includes portions of the tracks of a railway. Wheelsets of rail cars passing over those portions of the tracks will short circuit the track circuit (for example, within a pre-determined alternating current frequency band), and corresponding signals will be communicated to the termination shunts and warning predictor controller(s) to trigger safety systems such as gates, lights, bells or the like positioned at vehicle crossings.

A conventional railway termination shunt enclosure includes a box with swinging access lid and a plurality of ports through which electrical cables in communication with the termination shunt extend. The box may also enclose one or more electrical bus(es) for terminating and electrically connecting interior and exterior cables. However, enclosed spaces within the box are often crowded, disorganized and haphazard, frustrating efforts to install, replace and position termination shunts and related components. There is a need for an improved railway termination shunt enclosure.

SUMMARY

According to one aspect of the present invention, a railway termination shunt enclosure is provided. The enclosure includes one or more receptacles, each of the one or more receptacles being configured to receive a termination shunt. The enclosure also includes at least one mounting surface and a connector assembly rotatably attaching the one or more receptacles to one or more of the at least one mounting surface.

According to another aspect of the present invention, a railway termination shunt enclosure is provided. The enclosure comprises a carrier including one or more receptacles, each of the one or more receptacles being configured to receive a termination shunt. The carrier also includes at least one mounting surface and a connector assembly attaching the one or more receptacles to one or more of the at least one mounting surface. The enclosure also comprises at least one outer wall enclosing the carrier, defining an opening, and including a movable lid configured to selectively cover the opening. The carrier is sized for removal from the enclosure through the opening.

According to yet another aspect of the present invention, a railway termination shunt enclosure is provided. The enclosure includes a carrier. The carrier includes one or more receptacles. Each of the receptacle(s) is configured to receive a termination shunt. The carrier also includes at least one carrier wall attached to the receptacle(s). The at least one carrier wall includes a bottom edge. The enclosure also includes at least one outer wall enclosing the carrier and including a bottom wall defining one or more apertures. The bottom edge is positioned at a remove from the bottom wall to define a gap therebetween configured to receive cables respectively extending between the termination shunt(s) and the aperture(s).

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with regard to the attached drawing figures, wherein:

FIG. 11 is an exploded front perspective view of the inductor of FIG. 3 removed from its corresponding inductor mount;

FIG. 12 is a front perspective view of the inductor of FIG. 3 removably mounted to its corresponding inductor mount;

Figure 1:
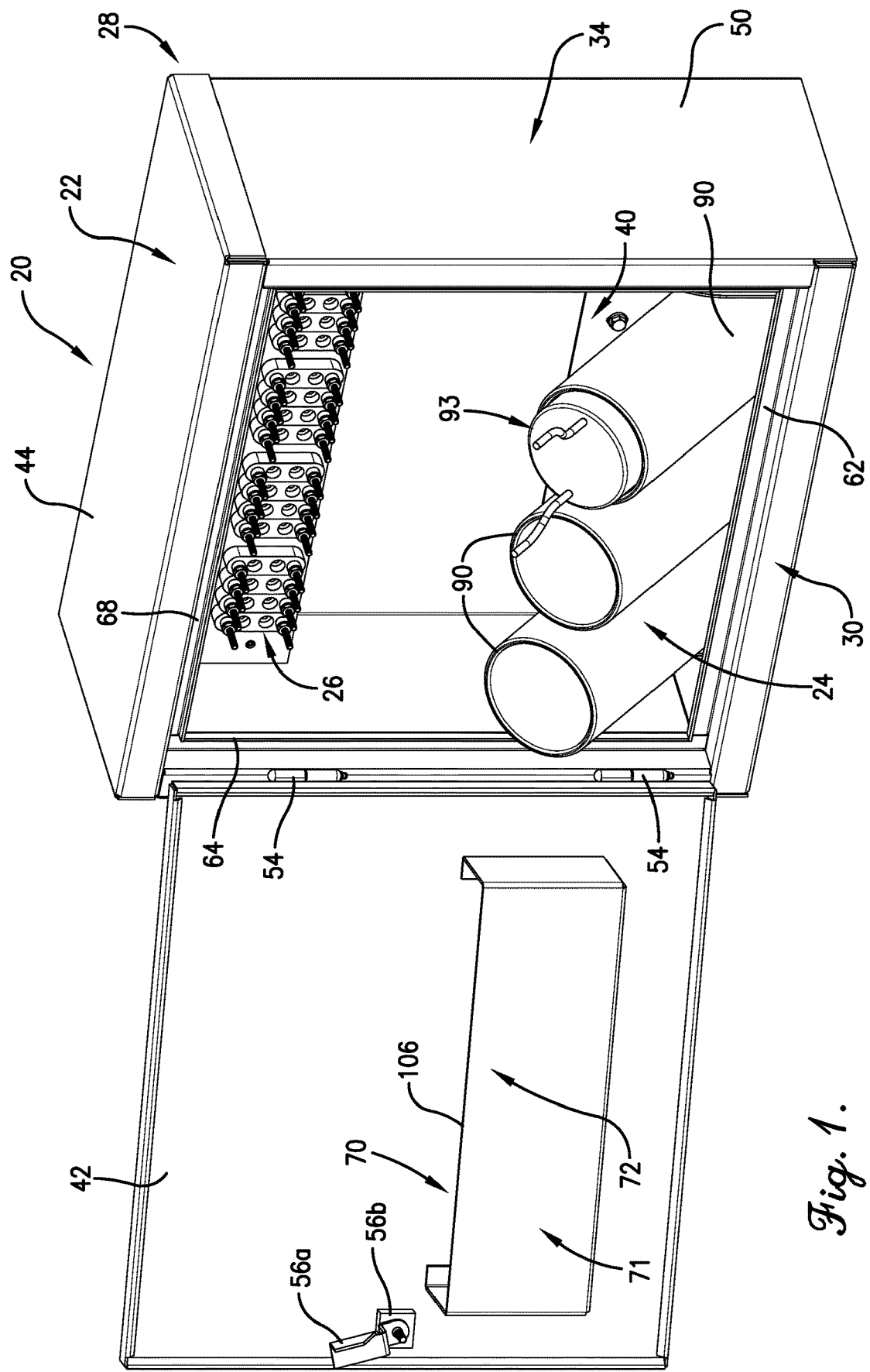
FIG. 1 is a front perspective view of a railway termination shunt enclosure with an open lid, in accordance with embodiments of the present invention.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (for example, top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

With initial reference to FIG. 1, a railway shunt enclosure 20 may include at least one outer wall 22, a carrier 24 and one or more terminals 26. The at least one outer wall 22 may comprise a top 28, bottom 30, left and right sides 32, 34, a back 36 and a front 38, together defining an enclosed space around the carrier 24 and the one or more terminals 26. The at least one outer wall 22 may partially or entirely be constructed from metals and metal alloys, such as aluminum, steel and/or the like, but may also or alternatively be constructed from other materials such as thermoplastics without departing from the spirit of the present invention.

The top 28, bottom 30, and left and right sides 32, 34 may together define an opening 40 therebetween. Each of the top 28, bottom 30, left and right sides 32, 34, back 36 and front 38 may primarily comprise a substantially planar panel with interior and exterior surfaces oriented perpendicularly to corresponding surfaces of adjacent planar panels to form a square prism shape. More particularly, the front 38 includes a front wall 42 comprising a movable lid configured to selectively cover the opening 40. Planar panels or walls of the top 28, bottom 30, left and right sides 32, 34, and back 36 are respectively designated 44, 46, 48, 50 and 52 in FIGS. 1-3.

One of ordinary skill will appreciate that a front of an at least one outer wall may also cooperate in defining a front opening without departing from the spirit of the present invention. It should also be noted that an at least one outer wall may be formed in a shape other than a square prism or cube within the scope of the present invention.

The front wall 42 is rotatably attached to the left side 32 by the illustrated hinges 54, and is attached to the opposite, right side 34 in a closed position by, for example, the illustrated latch comprising components 56a, 56b. A movable lid may be alternatively associated and/or engaged with remaining ones of an at least one wall—for example, by being slidable along tracks attached to a subset of the remaining ones and/or rotatably attached to another one of the walls—without departing from the spirit of the present invention.

Figure 2:
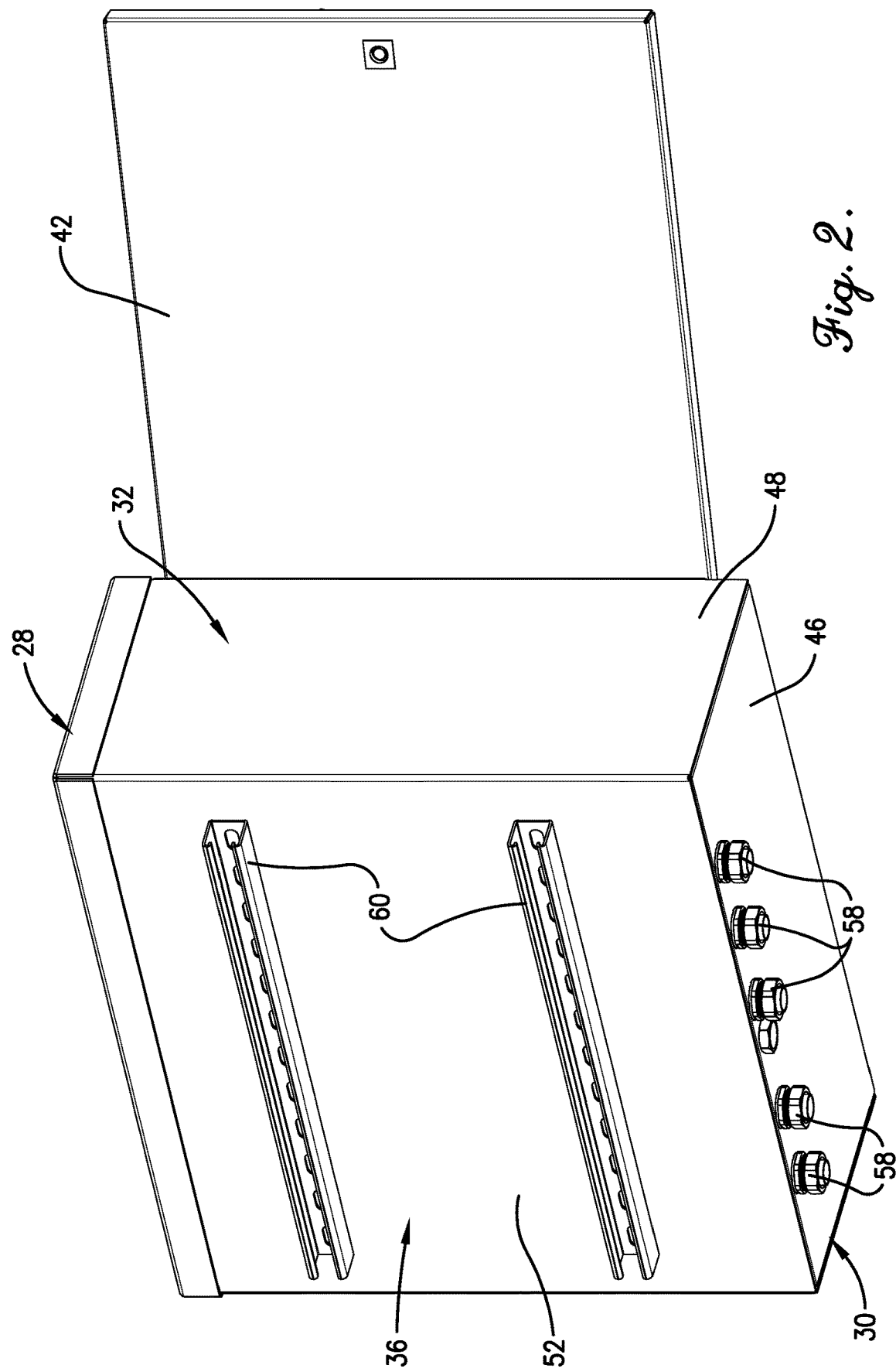
FIG. 2 is a rear perspective view of the enclosure of FIG. 1, illustrating outside surfaces of portions of bottom, front and rear outer walls.
Figure 3:
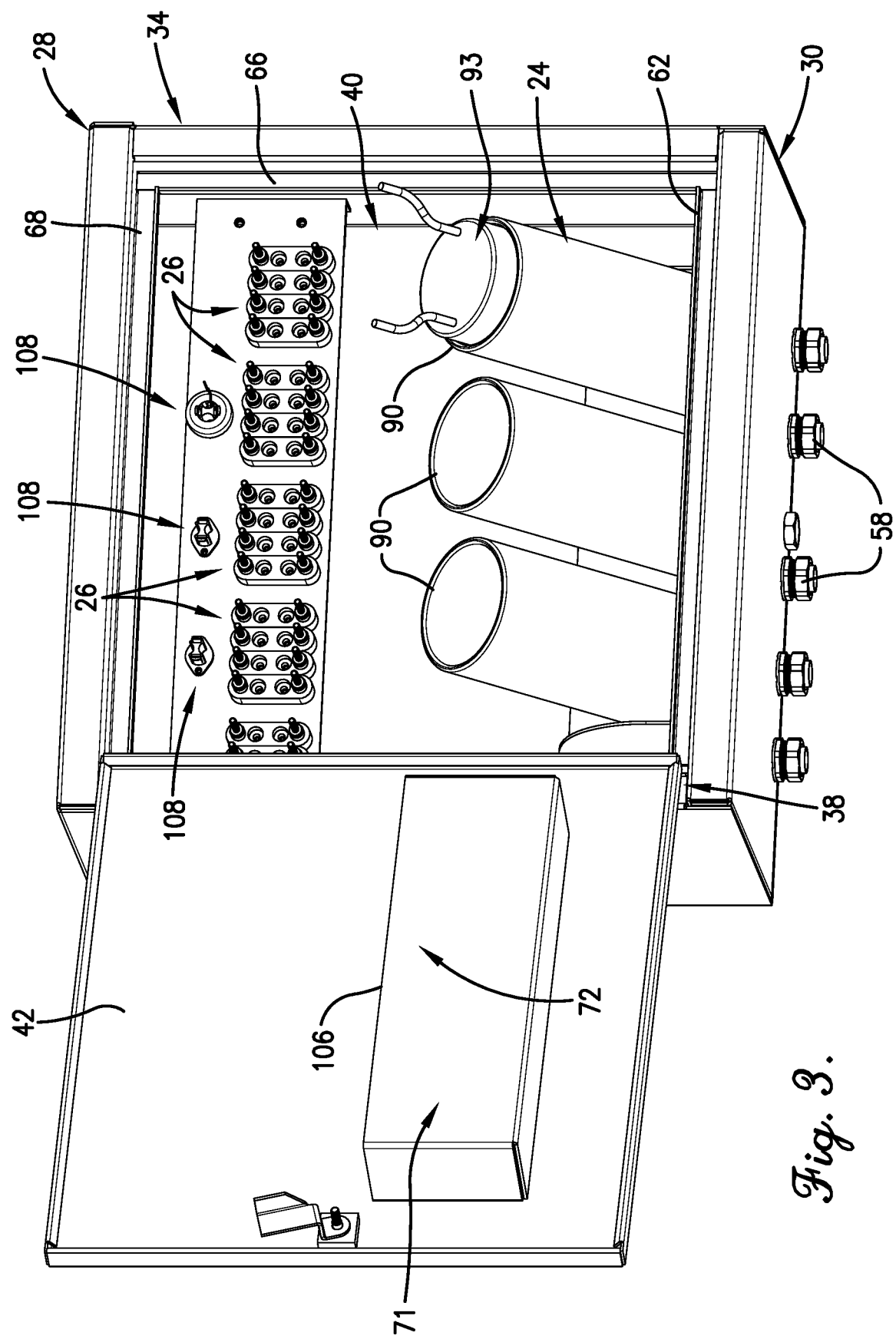
FIG. 3 is another front perspective view of the enclosure of FIG. 1, taken from a rotated vantage point to better illustrate the outside surface of a portion of the bottom outer wall and reveal an inductor mounted on one of a plurality of inductor mounts in accordance with embodiments of the present invention.

The illustrated front wall 42 is shown in an open position in FIGS. 1-3, and may be selectively closed by manual and/or automated actuation to cover the opening 40. One of ordinary skill will appreciate that alternative latching structures and/or biasing mechanisms (e.g., spring(s), hydraulic cylinder(s) or the like) may engage with and firmly hold a movable lid against remaining ones of an at least one outer wall in the closed position within the scope of the present invention.

In one or more embodiments, moving the front wall 42 to a closed position seals or substantially seals the enclosure 20. "Sealing" or "substantial sealing" of a termination shunt enclosure against ingress of liquids or particulates may be achieved with reference to a particular application and project requirements. Substantial sealing may be determined by an ingress protection rating measured according to INTERNATIONAL ELECTROTECHNICAL COMMISSION® (IEC™) 60529, "Degrees of Protection Provided by Enclosures" (the "IP Rating"). For example, sealing or substantial sealing of trackside termination shunt enclosures of embodiments of the present invention may meet IP 20 and IP 55 Ratings for dust and water ingress protection. In each case, the exemplary IP Ratings are determined according to standards promulgated at the time of the earliest priority filing hereof. One of ordinary skill will appreciate that a variety of methods and standards may be employed, and that the degree of sealing required for a particular application may vary, within the scope of the present technology.

More generally, except with respect to the structure and function described and taught herein for and/or relating to a carrier, removable and/or swingable receptacles, a simulated track inductor mount and/or surrounding cooperative structures, the structure and configuration of the termination shunt enclosure discussed herein is generally conventional in nature, as will be readily appreciated by one of ordinary skill in the art, and need not be described in further detail here. Furthermore, such conventional aspects of the railway shunt enclosure design may be varied without departing from the scope of the present invention. For instance, the positioning of apertures along an at least one outer wall for the passage of wiring therethrough, the positioning of terminals for joining leads of such external and internal wires, and/or the wiring patterns and/or positions of the wires themselves within the railway shunt enclosure, may vary according to the abilities of one of ordinary skill within the scope of the present invention.

Turning briefly now to FIG. 2, a plurality of apertures 58 are defined by or through the planar panel or wall 46 of the bottom 30, and are configured to accommodate wires passing therethrough (not shown). It is again noted here that the particular pattern of apertures depicted in FIG. 2 is provided by way of example only, and that more or fewer apertures positioned in varying positions and along different panels of an at least one outer wall are within the scope of the present invention.

The planar panel or wall 52 of the back 36 is also fixed (e.g., welded) to one or more U-brackets 60 that may be used to attach the enclosure 20 to an upright pole or other supporting structure for holding the enclosure 20 in an elevated position above ground surfaces. Alternative, additional and/or fewer fasteners for attaching an enclosure to supporting structure, or no fasteners at all, may be used without departing from the spirit of the present invention.

Turning now to FIG. 3, the bottom 30 also includes a ledge 62. The ledge 62 cooperates with ledges 64, 66 and 68, respectively of the left, right and top 32, 34, 28, to form a reduced dimension stop just inside of the opening 40. The reduced dimension stop seals against interior perimeter surfaces of the front wall or lid 42 when closed over the opening 40. The ledge 62 also engages with component(s) of the carrier 24 upon closure in one or more embodiments of the present invention, as discussed in more detail below.

The front 38 also includes a compartment 70. The compartment 70 is defined between the interior surface of the front wall 42 and a wall 71 fixed to the front wall 42. The compartment 70 is configured to hold papers, manuals or other objects to be protected from the elements. The wall 71 comprises an interior projecting surface 72 along an interior side. The interior projecting surface 72 also engages with component(s) of the carrier 24 upon closure in one or more embodiments of the present invention, as discussed in more detail below.

It should be noted that a wall defining a compartment and including an interior projecting surface is merely an exemplary structure. Engagement of an interior projecting surface with a carrier, as described in more detail below, may be achieved by a suitably configured surface projecting inward from an interior surface of a lid without regard to the particular shape of the underlying structure that presents the projecting surface (i.e., in this example, a square prism-shaped wall). In one or more embodiments, the projecting surface may be any surface removed and projecting from an interior surface of a lid without departing from the spirit of the present invention.

Figure 4:
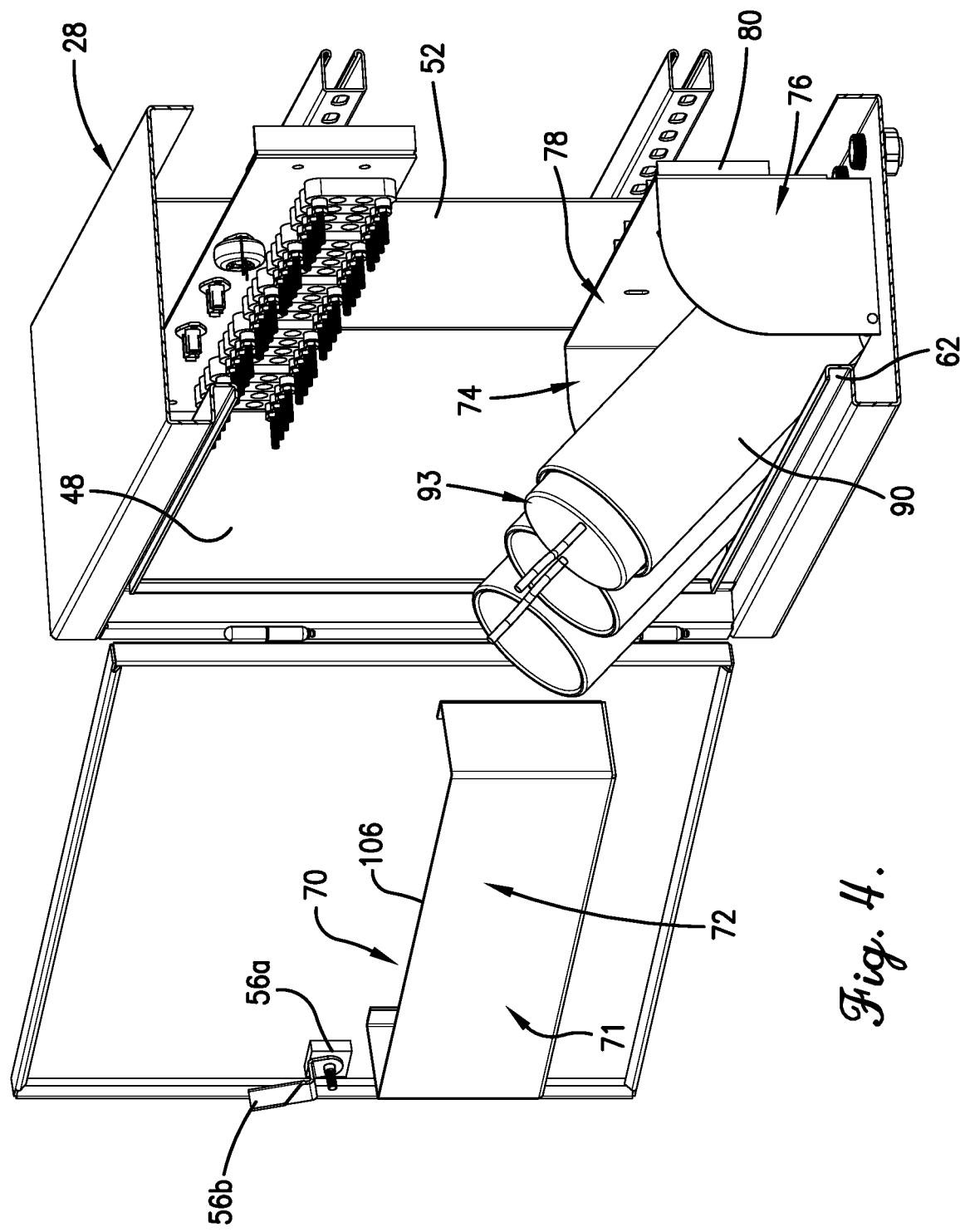
FIG. 4 is a partial side perspective view of the enclosure of FIG. 1, with a right outer wall and portions of rear, top and bottom outer walls sectioned or removed to reveal interior aspects of the enclosure.

Turning now to FIG. 4, the right side 34 and portions of the back, top and bottom 36, 28, 30 are removed to illustrate an exemplary disposition and orientation of the carrier 24 relative to the at least one outer wall 22. The carrier 24 includes generally left and right opposing sidewalls 74, 76 connected by a rear wall 78. The left and right sidewalls 74, 76 are illustrated as extending perpendicularly from the rear wall 78. The sidewalls 74, 76 and rear wall 78 are also shown as a monolithic or single piece, and may comprise metal or metal alloy (e.g., stainless steel). However, one of ordinary skill will appreciate that the sidewalls and rear wall may be angularly oriented differently with respect to one another and/or may comprise alternative materials without departing from the spirit of the present invention.

Figure 5:
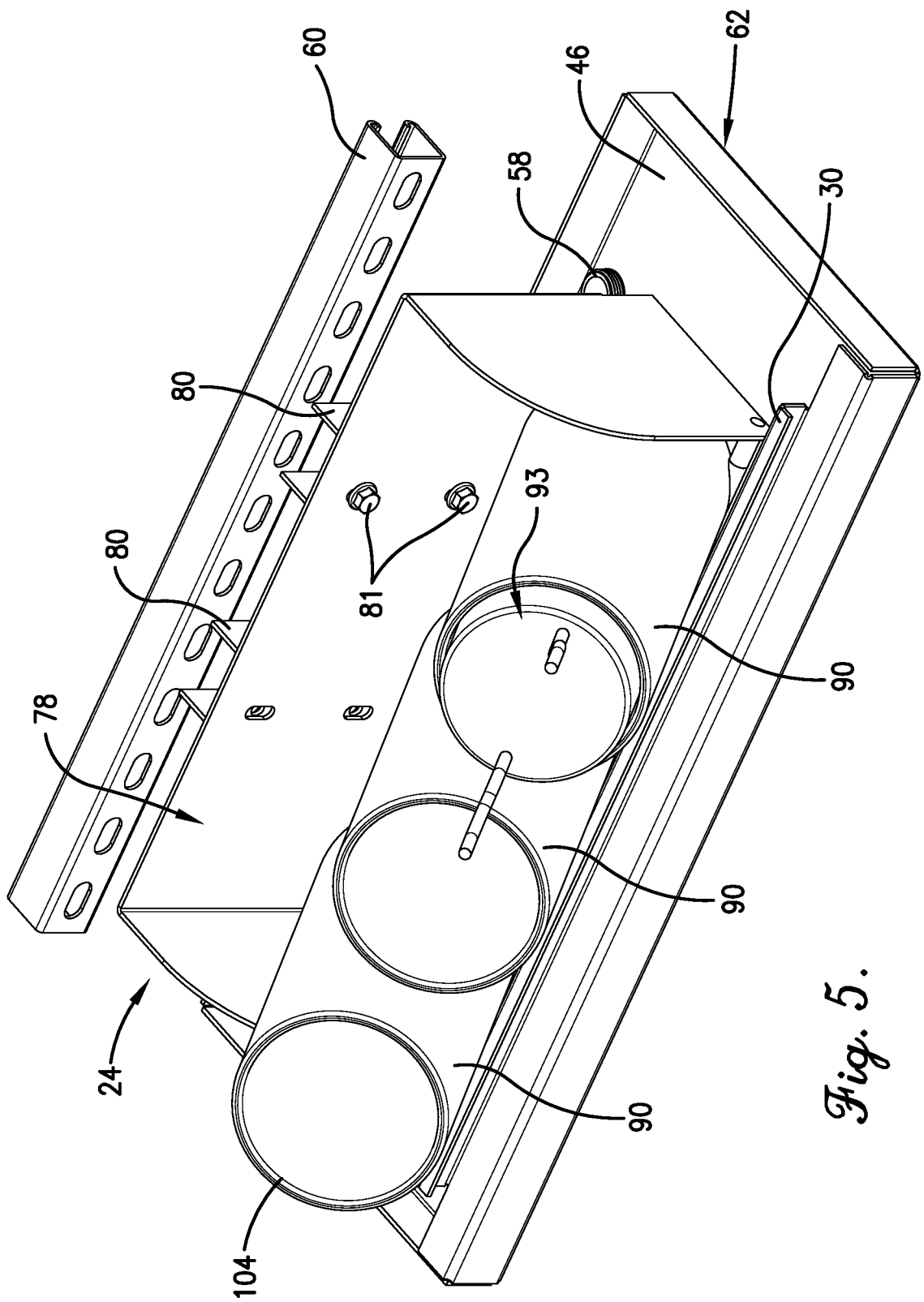
FIG. 5 is a partial perspective view of the enclosure of FIG. 1, illustrating a bottom outer wall and a carrier including a plurality of shunt receptacles in accordance with embodiments of the present invention.

Turning briefly to FIG. 5, the carrier 24 also includes spacers 80 fixed to and extending vertically along an outside surface of the rear wall 78. Two spacers 80 are shown, spaced laterally from one another along the rear wall 78. The spacers 80 are illustrated as U-brackets, and are removably fixed to the rear wall 78 by fasteners 81 extending through aligned apertures defined in the U-brackets and the rear wall 78. The spacers 80 may optionally also be fixed, removably or permanently, to the panel or wall 52 of the back 36 (e.g., via fasteners such as bolts or welding, in each case not shown). The spacers 80 serve to evenly space the remainder of the carrier 24 from the panel or wall 52 of the back 36, positioning the carrier 24 relative to the ledge 62 and the interior projecting surface 72 so as to enable proper rotation of other components of the carrier 24, as described in more detail below.

One of ordinary skill will appreciate that a variety of spacers or brackets may be included in a carrier and/or that components of a carrier may be alternatively sized relative to an at least one outer wall to facilitate rotational features of the carrier, such as those described in more detail below, without departing from the spirit of the present invention. It should also be noted that one or more spacers may instead or also be attached to or otherwise associated with a rear of an at least one outer wall to provide proper spacing within the scope of the present invention.

Figure 6:
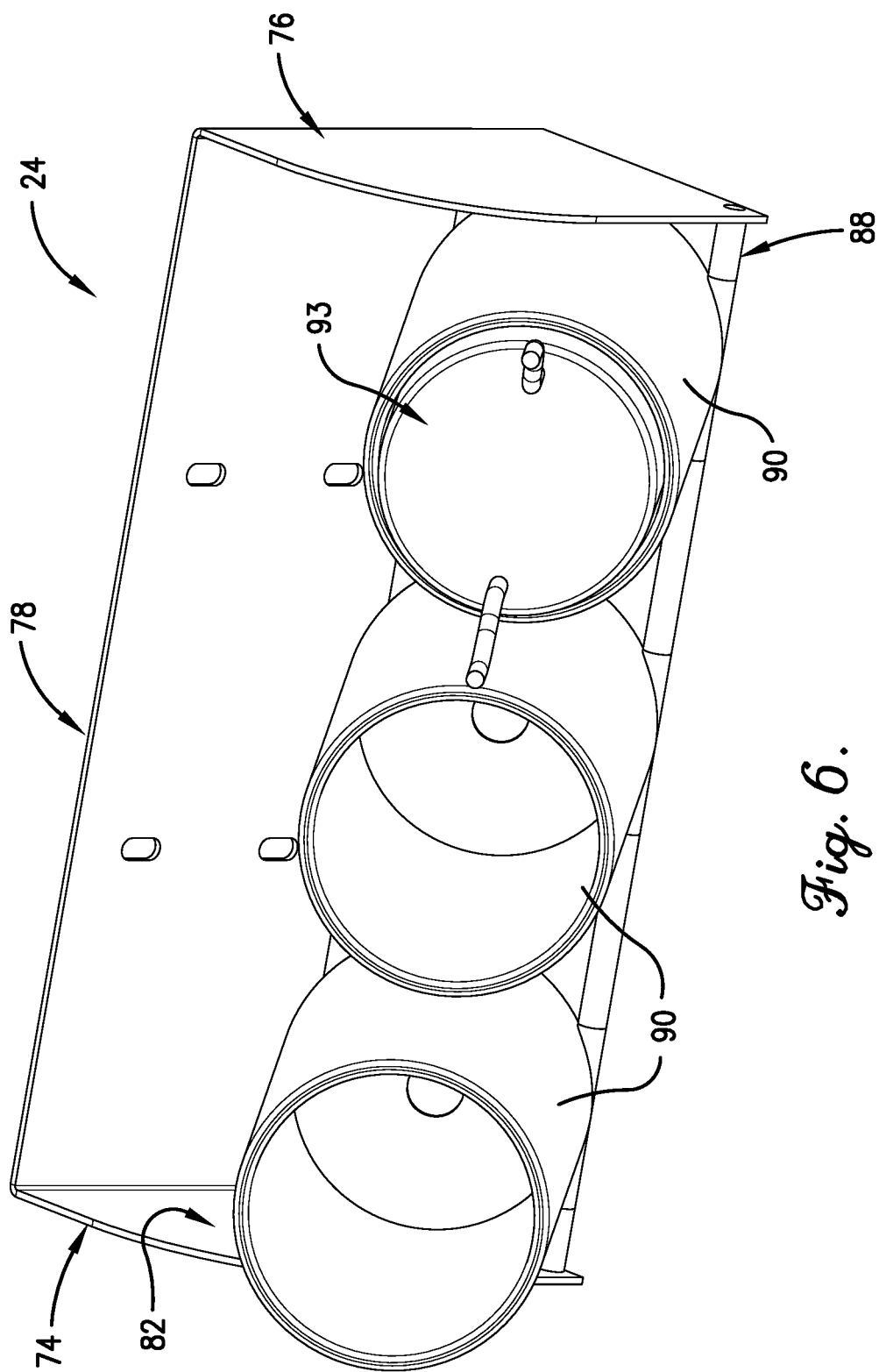
FIG. 6 is a front perspective view of the carrier of FIG. 5.
Figure 7:
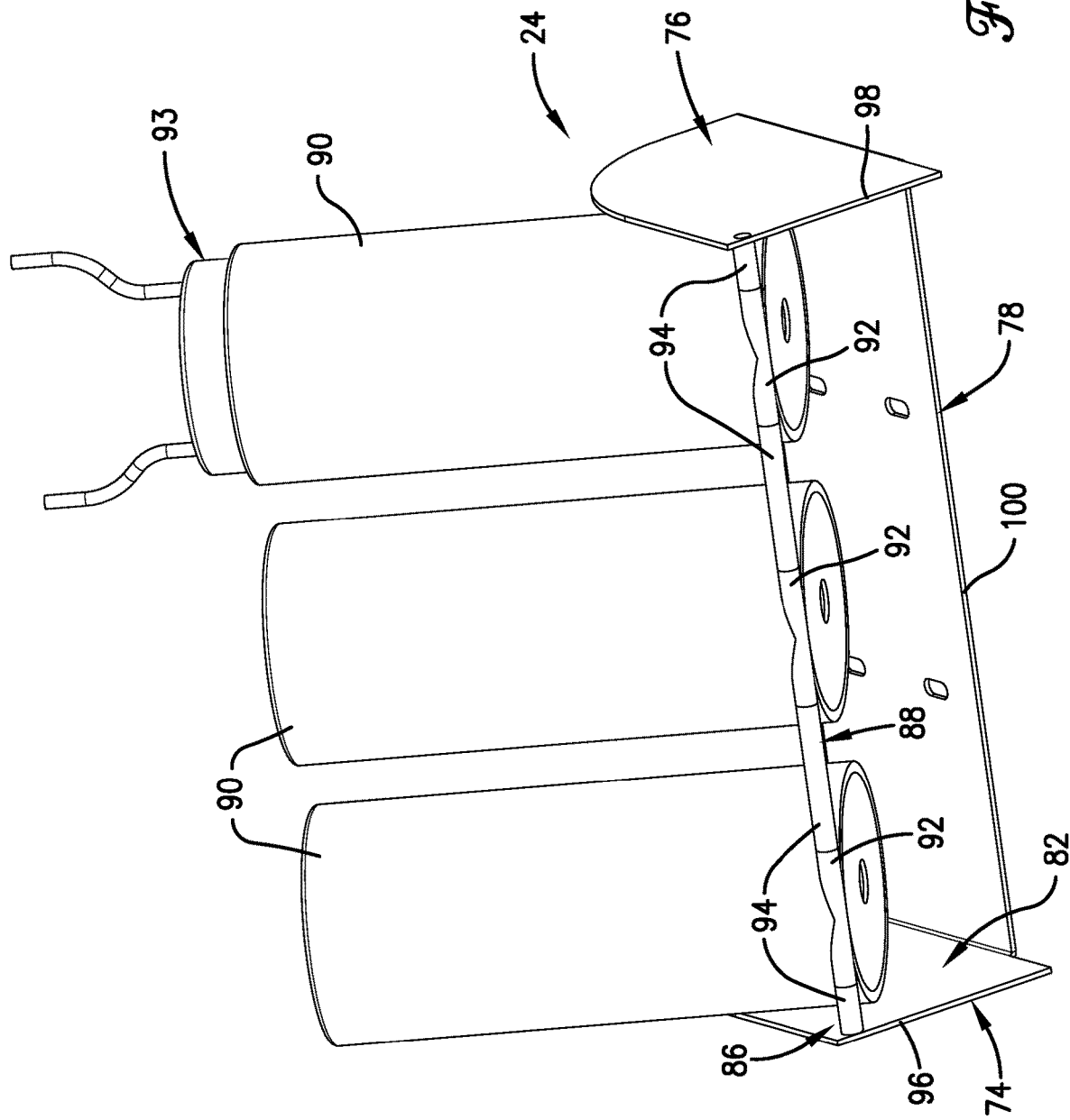
FIG. 7 is another front perspective view of the carrier of FIG. 5, taken from a rotated vantage point to better illustrate a connector assembly's association with the plurality of receptacles and with a mounting surface.
Figure 8:
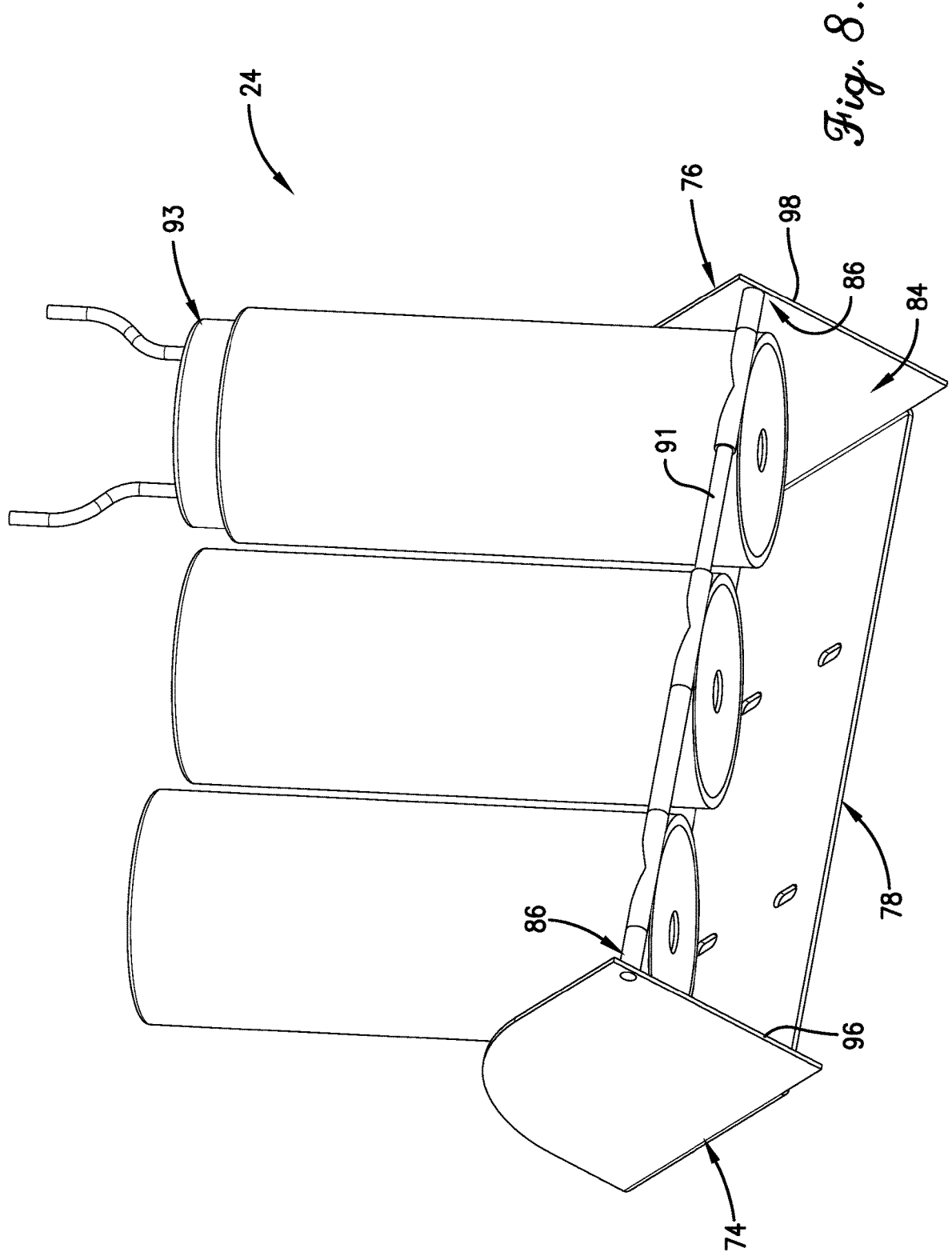
FIG. 8 is another front perspective view of the carrier of FIG. 5, taken from a rotated vantage point to better illustrate a connector assembly's association with a second, opposite mounting surface.

Turning now to FIGS. 6-8, interior surfaces 82, 84 respectively of left and right sidewalls 74, 76 each define a mounting surface 86. The carrier 24 also includes a connector assembly 88 extending between the mounting surfaces 86, and a plurality of receptacles 90. The connector assembly 88 is attached to the left and right sidewalls 74, 76 at the mounting surfaces 86, and rotatably suspends the receptacles 90 therebetween along or slightly above the bottom 30.

The receptacles 90 are each configured to at least partially enclose and house a termination shunt (an exemplary shunt 93 is illustrated in the rightmost receptacle 90). The receptacles 90 are each illustrated as open top cylinders with opposite, closed ends defining one or more apertures therethrough. The receptacles 90 and connector assembly 88 may comprise the same or different materials as the sidewalls and rear wall 74, 76, 78 of the carrier 24. Moreover, receptacles may be of alternative shapes, and may vary in number, without departing from the spirit of the present invention.

The illustrated connector assembly 88 includes a hinge comprising a pin 91 (FIG. 8) fixed to the opposite mounting surfaces 86 and extending through a plurality of knuckles 92, 94. Each of the knuckles 92 is fixed (e.g., welded) to a corresponding one of the receptacles 90, with the knuckles 92 being rotatable about the pin 91. The knuckles 94 are alternatingly positioned along the pin 91 to maintain lateral separation between the knuckles 92 and between the knuckles 92 and the sidewalls 74, 76. The receptacles 90 may, accordingly, be attached to the connector assembly 88 at the knuckles 92, but may rotate about the pin 91, as discussed in more detail below.

One of ordinary skill will appreciate that alternative connector assemblies may be used in embodiments of the present invention. For example, in a similar but modified configuration, mounting surfaces may comprise bearings along sidewalls of a carrier, with a pin being rotatably mounted to the bearings. Receptacles may be fixed to knuckles that are, in turn, fixed (e.g., welded) to the rotating pin so that the receptacles rotate in unison (at a fixed angle relative to each other) about the pin. For another example, mounting surfaces may instead be located along interior surfaces of sidewalls of an at least one outer wall, rather than sidewalls of a carrier, with a connector assembly rotatably mounting receptacles therebetween (such that the receptacles are rotatably supported directly by the outer wall(s) of the enclosure instead of an intermediate carrier). It should also be noted that other connector assemblies for rotatably mounting one or more receptacles may be used without departing from the spirit of the present invention. Moreover, in one or more embodiments, a connector assembly may non-rotatably suspend one or more receptacles. For example, receptacles may be welded or soldered to, or integrally formed with, one or more mounting surfaces, with the intervening connective materials between the receptacles and mounting surfaces comprising a connector assembly.

It should also be noted that, in one or more embodiments, including the illustrated embodiment, the carrier 24 is positioned within the at least one outer wall 22 so that bottom edges 96, 98 of the sidewalls 74, 76 engage with and are supported on the interior surface of the bottom wall or panel 46. However, a bottom or terminal edge 100 of the rear wall 78 of the carrier 24 stops short of or is at a remove from the interior surface of the bottom wall or panel 46, defining a gap 102 therebetween. (See FIG. 9) The gap 102 provides clearance for wire(s) of the termination shunt(s) 93 enclosed or housed by the receptacles 90 to extend to corresponding aperture(s) 58 through the bottom wall or panel 46.

Returning briefly to FIGS. 3-4, it should be noted that the width and height of the sidewalls 74, 76 and rear wall 78 of the carrier 24, as well as of the receptacles 90 and spacers 80, are preferably sized so that the overall profile in lateral (width) and height dimensions of the carrier 24 are less than those of the opening 40 and of the reduced dimension stop, to permit removal of the carrier 24 from the at least one outer wall 22, facilitating installation and wiring operations.

Further, rotation of the receptacles 90 may be bounded and defined by surrounding structures of the enclosure 20. FIGS. 3-4 illustrate the front wall or lid 42 in an open position, and show the receptacles 90 leaning out over the ledge 62 and protruding through the opening 40. One of ordinary skill will appreciate that the receptacles 90 may be biased to lean out while the lid 42 is open (e.g., by weight disposition along the connector assembly 88 and/or because of a biasing member such as a spring (not shown)) and/or may simply be free to rotate into such a protruding orientation by manual manipulation. Further rotation of the receptacles 90 is arrested by the positioning of the ledge 62 of the bottom 30. That is, front portions of the receptacles 90 engage with the ledge 62 at one or more rotational positions, and the engagement prevents or otherwise restricts further rotation and protrusion of the receptacles 90. The ledge 62 thus advantageously serves dual purposes—participating in a seal with the lid 42 and being positioned so as to optimally arrest further rotation of the receptacles 90 when the lid 42 is open.

Figure 9:
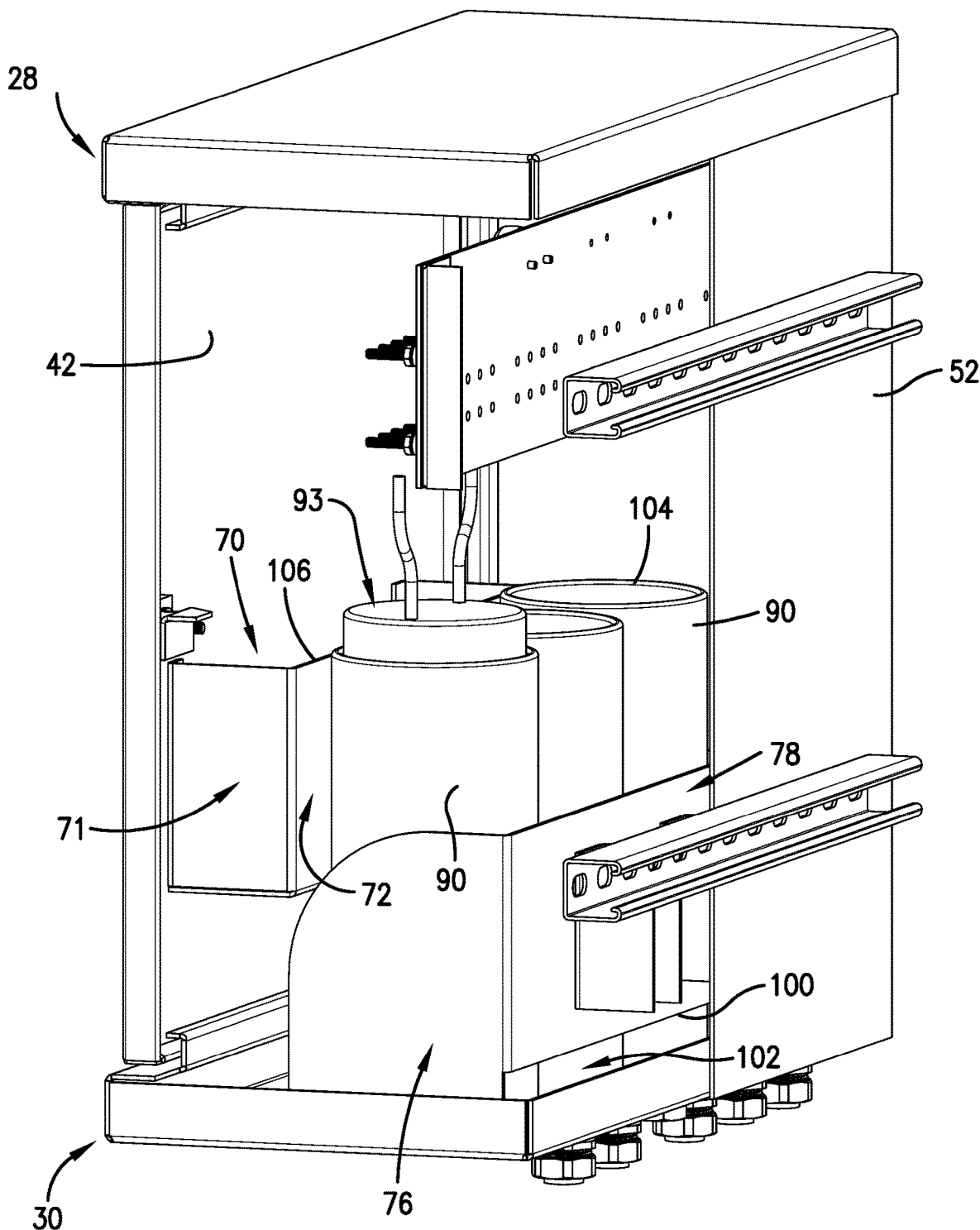
FIG. 9 is a partial side perspective view of the enclosure of FIG. 1, illustrating a closed front wall and having portions of rear and right-side outer walls removed.
Figure 10:
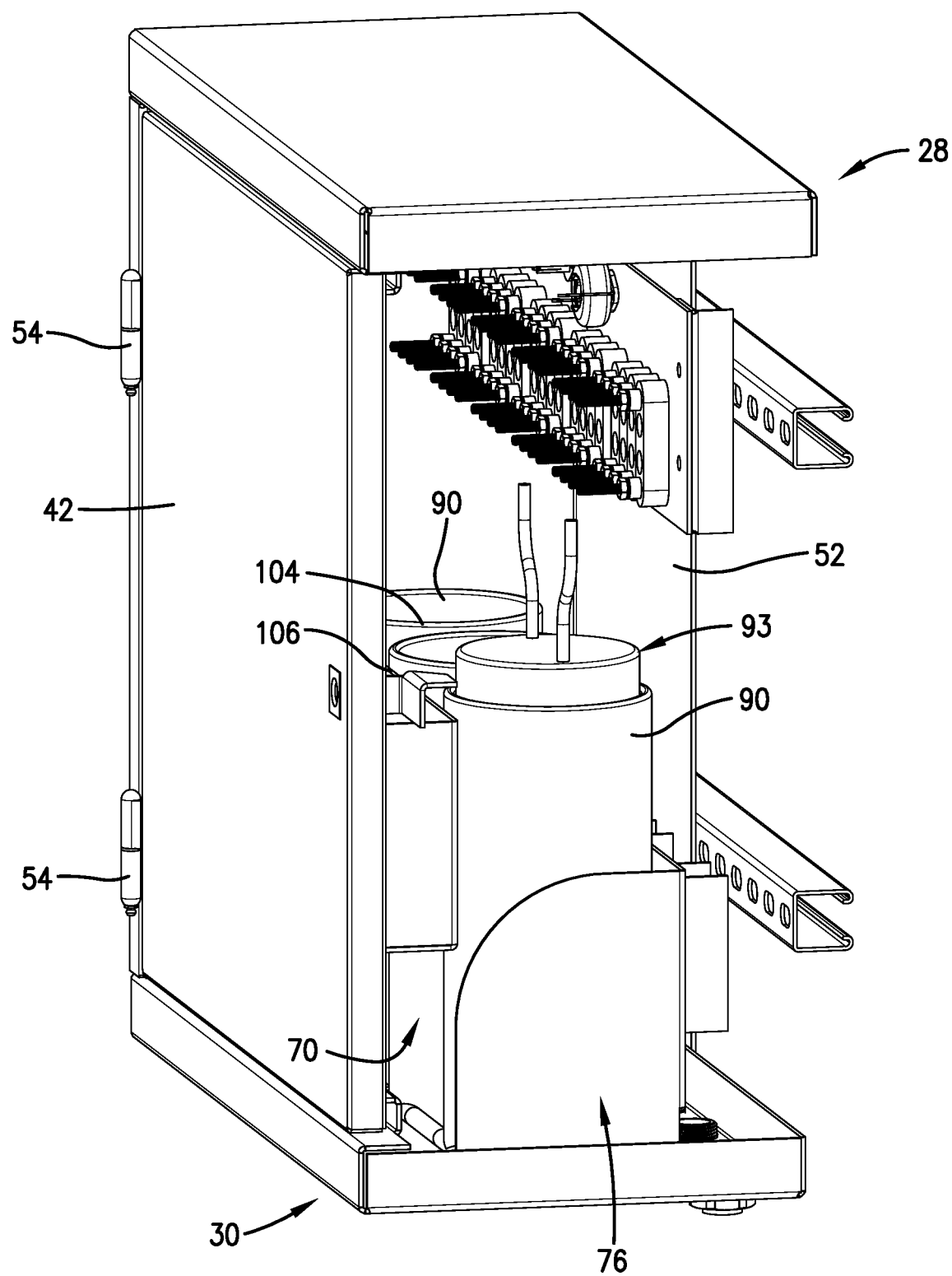
FIG. 10 is a rotated view of the enclosure of FIG. 9.
Figure 13:
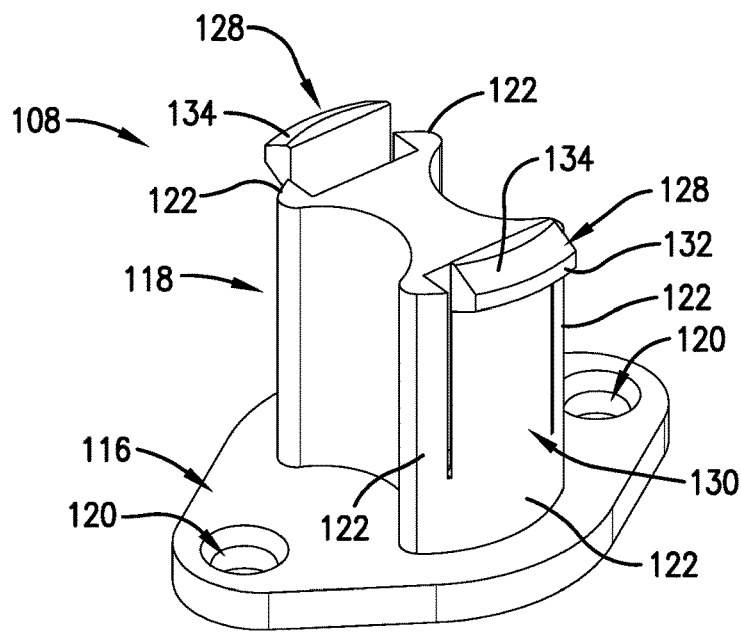
FIG. 13 is a side perspective view of the inductor mount of FIG. 11.

Turning now to FIGS. 9-10, lid 42 is illustrated in a closed position, sealed against the reduced dimension stop formed by ledges 62, 64, 66, 68. In the process of closure—whereby the lid 42 swings about the hinges 54—the interior projecting surface 72 is pressed into contact with one or more of the receptacles 90. The contact or engagement between the interior projecting surface 72 and the one or more receptacles 90 causes each engaged receptacle 90 (whether engaged directly or indirectly through common connection to the pin 91) to counter-rotate from the protruded position into a retracted position within the interior space formed by the at least one outer wall 22.

For example, a rim 104 of a leftmost receptacle 90 may first engage with and contact the interior projecting surface 72, counter-rotating and sliding up the interior projecting surface 72 as the lid 42 closure progresses. Receptacles 90 positioned further to the right may either rotate with the leftmost receptacle 90 (for example, where receptacles 90 are bound to rotate together because each is respectively fixed to the pin 91) or may successively, in a left-to-right order, undergo the same engagement and counter-rotation processes as the lid 42 closure progresses. For another example, such as where the interior projecting surface 72 is positioned low relative to the receptacles 90, the interior projecting surface 72 may include an upper edge 106 for engaging front surfaces of the receptacles 90, with counter-rotation otherwise proceeding in the fashion outlined in the first example above.

Embodiments of the invention therefore include a removable and/or swingable carrier for enclosing and/or housing one or more termination shunts in one or more corresponding receptacles. Embodiments of the invention provide for organized, decluttered and generally easier installation, removal and wiring of termination shunts within termination shunt enclosures.

Turning now to FIGS. 3 and 11, a plurality of simulated track inductor mounts 108 are illustrated. The number of mounts 108 preferably corresponds to the number of termination shunts 93 housed within the enclosure 20. The mounts 108 are removably fixed (e.g., via fasteners (not shown)) to a supporting surface comprising the interior surface of the back panel or wall 52. However, it should be noted that more or fewer mounts may be used within an enclosure and/or that one or more mounts according to embodiments of the present invention may be alternatively located within the enclosure and/or be located outside an enclosure without departing from the spirit of the present invention.

Each mount 108 is configured to removably seat a corresponding simulated track inductor 110. The illustrated inductor 110 is toroidal, defining a ring-shaped inner margin or surface 112. The ring-shaped inner surface 112 is substantially symmetrical, presenting a relatively constant inner radius, but includes a projection 114 extending further radially inward or inside of the radius and inner surface 112.

The illustrated projection 114 comprises a fastener in the form of a cable tie. One of ordinary skill will appreciate that alternative fasteners may be incorporated into a simulated track inductor and/or that more, fewer or no fasteners may be used without departing from the spirit of the present invention. It should also be noted that an inner surface may vary in shape and/or size within the scope of the present invention. For example, an inductor may be in a non-toroidal shape, and therefore may present an inner surface configured other than in a ring shape, without departing from the spirit of the present invention.

Turning more broadly to FIGS. 11-15, the inductor 110 is removably seated on the mount 108. The mount 108 includes a base 116 and a hub 118. The illustrated base 116 is a plate flange that defines apertures 120 therethrough. Fasteners (not shown) such as sheet metal screws may be inserted through the apertures 120 and engaged with the back panel 52 or another supporting surface to secure the mount 108 thereagainst. One of ordinary skill will appreciate that a base may be alternatively shaped or configured, and/or may engage differently with a supporting surface (and may be integral with or welded thereto), without departing from the spirit of the present invention.

The hub 118 is attached to or formed integrally with the base 116. The hub 118 includes one or more surfaces 122 defining an outer margin M of the hub 118 configured to engage with the inner surface 112. More particularly, the illustrated surfaces 122 are arcuate or convex in shape, cooperating to define a substantially cylindrical margin M with sufficient radius to ensure engagement between the surfaces 122 and corresponding portions of the inner surface 112 of the inductor 110. One or ordinary skill will appreciate that inner surfaces of different shapes, and corresponding margins of differing shapes, are within the scope of the present invention.

The substantially cylindrical margin M is circumferentially interrupted or broken along at least one portion. More particularly, at least one recession 124 from the margin M is formed by corresponding relieved surface(s) 126 extending radially inside the margin M and alternatingly disposed between the surfaces 122. The recession(s) 124 are sized to accommodate projection(s) 114 where the inductor 110 is removably seated on the mount 108.

One of ordinary skill will appreciate that inductors may include varying numbers and types of projections, and that inductor mounts may include a varying number of recessions (for example, more than the number of projections, if it is desired to allow an inductor to be oriented in a plurality of rotational positions on the mounts) without departing from the spirit of the present invention. It should also be noted that relieved surfaces defining recessions of alternative shape (i.e., other than arcuate or concave) are within the scope of the present invention.

Figure 14:
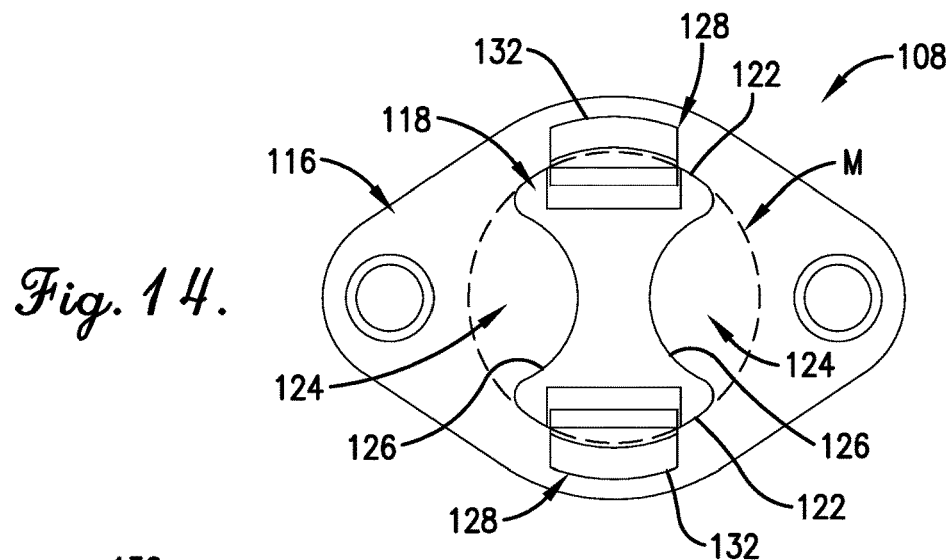
FIG. 14 is a front view of the inductor mount of FIG. 11.
Figure 15:
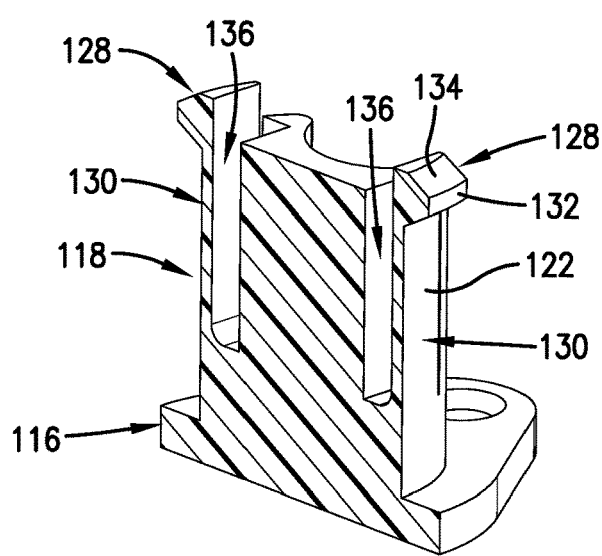
FIG. 15 is a perspective, vertical cross-section of the inductor mount of FIG. 11 cut through a lateral center of the inductor mount.

In one or more embodiments, the hub 118 also includes one or more camming tabs 128. The illustrated hub 118 includes two tabs 128, each being fixed to (i.e., either attached to or formed integrally with) a cantilevered flange 130 presenting a corresponding portion of the surfaces 122. Radially outer surfaces 132 of the tabs 128 are configured to rest radially outside of the margin M (FIG. 14). In one or more embodiments, surfaces 122 presented on the outside of flanges 130 also rest radially outside of the margin M (FIG. 14).

Each tab 128 also includes a chamfered surface 134 adjacent each outer surface 132. The chamfered surface 134 facilitates smooth engagement between the inner surface 112 and the tab 128. More particularly, the chamfered surface 134 permits a user to flex the tab 128 radially inward with a single motion pressing the inductor 110 axially onto the hub 118 (with the engagement along the chamfered surface 134 causing the inward flexing of the tab 128), removing the need for a second, independent user movement pressing on the tab 128 in a radially inward direction.

The hub 118 also defines a gap 136 radially inside each flange 130. Each gap 136 is preferably wide enough to allow radially inward flexing of the corresponding tab 128 until the outer surface 132 is positioned substantially along the margin M.

As the inductor 110 is mounted to the mount 108, the inner surface 112 engages with the tabs 128, causing the flanges 130 and tabs 128 to flex radially inward and allow the inner surface 112 to slide axially onto the hub 118. Once the inner surface 112 is past the tabs 128, the flanges 130 and tabs 128 flex radially outward again toward or into the resting position, with the outer surfaces 132 being radially outside of the inner surface 112 to restrict removal of the inductor 110 from the hub 118 and complete the removable seating operation.

One of ordinary skill will appreciate that a camming tab may be mounted to different structure on or associated with a hub, may be mounted in different positions along a hub, may be more or less numerous, and/or may be differently shaped, without departing from the spirit of the present invention.

Embodiments of the present invention therefore provide for easy and secure installation and removal of simulated track inductors, for example within termination shunt enclosures.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A railway shunt enclosure comprising:
an outer wall defining an interior space;
a receptacle configured to receive a shunt; and
a connector assembly including a first portion fixed relative to the outer wall and a rotatable second portion fixed relative to the receptacle, such that the receptacle is rotatable between a retracted position, wherein the receptacle is positioned within the interior space, and a protruded position, wherein at least a portion of the receptacle protrudes from the interior space,
one of said portions of the connector assembly including a pin, and the other of said portions of the connector assembly including a first knuckle rotatably received on the pin,
said pin being fixedly coupled relative to the outer wall,
said first knuckle being fixed to the receptacle,
said connector assembly including a second knuckle configured to maintain lateral separation between the outer wall and the first knuckle,
said second knuckle being received on the pin.

2. The railway shunt enclosure as claimed in claim 1,
said outer wall defining an opening,
said receptacle partially protruding through the opening in the protruded position,
said receptacle being wholly positioned outside the opening and within the interior space in the retracted position.

3. The railway shunt enclosure as claimed in claim 2,
said outer wall including a movable lid shiftable between a closed position, wherein the opening is covered, and an open position, wherein the opening is at least partially uncovered.

4. The railway shunt enclosure as claimed in claim 3,
said movable lid including an interior projecting surface attached thereto, the interior projecting surface extending into the interior space in the closed position,
said interior projecting surface positioned to engage the receptacle such that, when the movable lid is shifted from the open position to the closed position, the interior projecting surface engages the receptacle so as to rotate the receptacle from the protruded position to the retracted position.

5. The railway shunt enclosure as claimed in claim 3,
said movable lid configured to engage the receptacle so as to rotate the receptacle from the protruded position to the retracted position when the movable lid is shifted from the open position to the closed position.

6. The railway shunt enclosure as claimed in claim 1,
said outer wall being positioned to engage the receptacle in the protruded position so as to restrict additional rotation and protrusion of the receptacle.

7. The railway shunt enclosure as claimed in claim 1,
said receptacle including an open top and an opposite closed end,
said second portion of the connector assembly being fixed to the receptacle adjacent the closed end.

8. The railway shunt enclosure as claimed in claim 7, said closed end of the receptacle defining at least one aperture therethrough.

9. A railway shunt enclosure comprising:
an outer wall defining an interior space; and
a plurality of receptacles, each of which is configured to receive a shunt,
each receptacle of said plurality of receptacles being rotatable relative to the outer wall between a retracted position and a protruded position,
wherein the plurality of receptacles are positioned within the interior space in the retracted position, and
wherein at least a portion of the plurality of receptacles protrude from the interior space in the protruded position,
said plurality of receptacles being individually rotatable so that each receptacle is rotatable between the retracted and protruded positions independent of the other receptacles.

10. The railway shunt enclosure as claimed in claim 9,
said outer wall defining an opening,
each receptacle of said plurality of receptacles partially protruding through the opening in the protruded position,
each receptacle of said plurality of receptacles being wholly positioned outside the opening and within the interior space in the retracted position.

11. The railway shunt enclosure as claimed in claim 10,
said outer wall including a movable lid shiftable between a closed position, wherein the opening is covered, and an open position, wherein the opening is at least partially uncovered.

12. The railway shunt enclosure as claimed in claim 11,
said movable lid including an interior projecting surface attached thereto, the interior projecting surface extending into the interior space in the closed position,
said interior projecting surface positioned to engage each of the receptacles such that, when the movable lid is shifted from the open position to the closed position, the interior projecting surface engages each receptacle so as to rotate each receptacle from the protruded position to the retracted position.

13. The railway shunt enclosure as claimed in claim 11,
said movable lid configured to engage each of the receptacles so as to rotate each receptacle from the protruded position to the retracted position when the movable lid is shifted from the open position to the closed position.

14. The railway shunt enclosure as claimed in claim 9,
said outer wall being positioned to engage each of the receptacles in the protruded position so as to restrict additional rotation and protrusion of each receptacle.

15. The railway shunt enclosure as claimed in claim 9,
each receptacle of said plurality of receptacles including an open top and an opposite closed end.

16. The railway shunt enclosure as claimed in claim 9, said closed end of each receptacle defining at least one aperture therethrough.

17. The railway shunt enclosure as claimed in claim 9 further comprising a hinge rotatably supporting the receptacles relative to the outer wall.

18. The railway shunt enclosure as claimed in claim 17
said hinge including a pin fixedly coupled relative to the outer wall,
said hinge including a plurality of first knuckles, each of which is fixed to a respective one of the receptacles and rotatably received on the pin,
said hinge including a plurality of second knuckles received on the pin,
said first and second knuckles being alternatingly positioned along the pin so as to maintain lateral separation between the receptacles.

\* \* \* \* \*